UNITED STATES PATENT OFFICE.

WILHELM NEELMEIER, HEINRICH JORDAN, AND KARL HEUSNER, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

BLUE DISAZO DYE.

1,169,344.      Specification of Letters Patent.      Patented Jan. 25, 1916.

No Drawing.      Application filed January 29, 1915. Serial No. 5,032.

*To all whom it may concern:*

Be it known that we, WILHELM NEELMEIER, HEINRICH JORDAN, and KARL HEUSNER, citizens of the German Empire, residing at Leverkusen, near Cologne, Germany, have invented new and useful Improvements in Blue Disazo Dye, of which the following is a specification.

We have found that new and valuable disazo dyestuffs capable of being further developed can be obtained by coupling the diazo compound of an orthodisubstituted acidyl-para-phenylenediamin having most probably the following general formula:

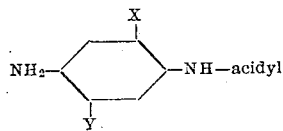

(X and Y being substituents *e. g.* alkyl, oxyalkyl, halogen) such as the 5-amino-4-chloro-2-acetylamino-1-phenolmethylether

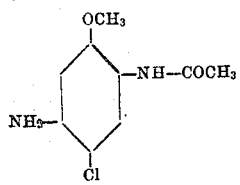

with a 1-amino-2-naphtholether-6-sulfonic acid:

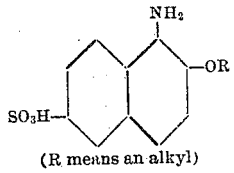

(R means an alkyl)

further diazotizing and combining the resulting diazo compound with the 1-naphthol-4-sulfonic acid.

The new products are after being dried and pulverized in the shape of their alkali metal salts dark powders soluble in water generally with a blue coloration. Upon reduction with zinc powder and acetic acid they are broken up into an ortho disubstituted para-phenylenediamin compound, an 1.4-diamino-2-naphtholether-6-sulfonic acid and an 1-hydroxy-2-aminonaphthalin-4-sulfonic acid. They dye cotton generally blue shades, which can be converted by diazotation on fiber and after treatment with suitable developers, such as beta-naphthol, into bright greenish-blue shades fast to washing which can be discharged with hydrosulfite to a pure white.

In order to illustrate the new process more fully the following example is given, the parts being by weight: 22.4 parts of 5-amino-4-chloro-2-acetylamino-1-phenolmethylether are dissolved in 700 parts of water with the addition of sodium carbonate to a neutral solution. The solution is cooled with ice to 10–15° C. and diazotized with 34.5 parts of hydrochloric acid (19° Bé.) and 6.9 parts of sodium nitrite. The diazo compound is added at a temperature of 10–15° C. to a solution containing 8.5 parts of sodium acetate and 28.9 parts of 1-amino-2-naphtholethyleter-6-sulfonic acid (sodium salt). The resulting intermediate compound separates. It is filtered off, stirred up with water and ice and is converted into the sodium salt by adding to the suspension at 0° 50 parts of caustic soda lye (16 per cent.). Subsequently it is further diazotized by means of 6.9 parts of sodium nitrite and 85 parts of hydrochloric acid (19° Bé.). The diazo compound is then added to a solution of 24.6 parts of 1-naphthol-4-sulfonic acid (sodium salt) containing 69 parts of soda. The dye is salted out and heated to boiling during ¼ hour with caustic soda lye to split off the acetyl group. After cooling it is separated by neutralizing the alkaline solution.

Our new product is a dark powder soluble in concentrated sulfuric acid with a bluish coloration dyeing cotton blue which after diazotation and development with beta-naphthol changes into a beautiful bright greenish-blue fast to washing. The new dye has in a free state most probably the formula:

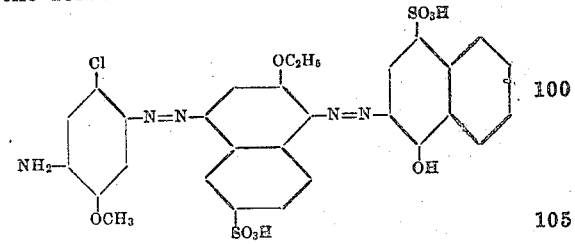

It is soluble in water with a bluish coloration, yielding upon reduction with zinc powder and acetic acid 2.5-diamino-4-chloro-1-anisol, 1.4-diamino-2-ethoxynaphthalene-6-sulfonic acid and 2-amino-1-naphthol-4-sulfonic acid. As first component another of the above cited compounds can be used e. g. 5 - amino-4-methyl-2-acetylamino-1-phenol-methylether.

We claim:—

1. The herein described new disazo dyestuffs which are after being dried and pulverized in the shape of their alkali metal salts dark powders soluble in water generally with a bluish coloration; yielding upon reduction with zinc powder and acetic acid an ortho-disubstituted para-phenylenediamin, an 1.4-diamino-2-naphtholether-6-sulfonic acid and 1-hydroxy-2-aminoaphthalene-4-sulfonic acid; dyeing cotton generally blue shades which can be converted by diazotizing them on fiber and after treatment with beta-naphthol into bright greenish-blue shades fast to washing which can be discharged with hydrosulfite to a pure white, substantially as described.

2. The herein described new disazo dyestuffs which are after being dried and pulverized in the shape of their alkali metal salts dark powders soluble in water generally with a bluish coloration; yielding upon reduction with zinc powder and acetic acid a 2-alkoxy-1.4-phenylenediamin substituted in the 5-position, an 1.4-diamino-2-naphtholether-6-sulfonic acid and 1-hydroxy-2-aminonaphthalene-4-sulfonic acid; dyeing cotton generally blue shades which can be converted by diazotizing them on fiber and after-treatment with beta-naphthol into bright greenish-blue shades fast to washing which can be discharged with hydrosulfite to a pure white, substantially as described.

3. The herein described new disazo dyestuffs which are after being dried and pulverized in the shape of their alkali metal salts dark powders soluble in water generally with a bluish coloration; yielding upon reduction with zinc powder and acetic acid a 2-alkoxy-1.4-phenylenediamin substituted in the 5-position, an 1.4-diamino-2-naphtholethylether-6-sulfonic acid and 1-hydroxy - 2 - aminonaphthalene - 4 - sulfonic acid; dyeing cotton generally blue shades which can be converted by diazotizing them on fiber and aftertreatment with beta-naphthol into bright greenish-blue shades fast to washing which can be discharged with hydrosulfite to a pure white, substantially as described.

4. The herein described new disazo dyestuff which has in a free state most probably the formula:

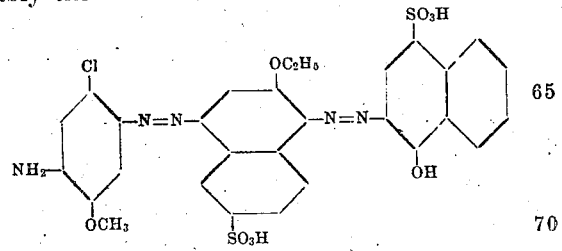

and which is after being dried and pulverized in the shape of its sodium salt a dark powder soluble in in concentrated sulfuric acid with a bluish coloration; yielding upon reduction with zinc powder and acetic acid 2.5-diamino-4-chloro-1-anisol, 1.4-diamino-2-ethoxynaphthalene-6-sulfonic acid and 2-amino-1-naphthol-4-sulfonic acid; dyeing cotton blue shades which after diazotation and development with beta-naphthol change into a beautiful bright greenish-blue fast to washing, substantially as described.

In testimony whereof we have hereunto set our hands in the presence of two subscribing witnesses:

WILHELM NEELMEIER. [L. S.]
HEINRICH JORDAN. [L. S.]
KARL HEUSNER. [L. S.]

Witnesses:
HELEN NUFER,
ALBERT NUFER.